US012658795B2

(12) United States Patent (10) Patent No.: US 12,658,795 B2
Kihm et al. (45) Date of Patent: Jun. 16, 2026

(54) NON-LINEAR TRANSIENT IMPROVEMENTS IN CURRENT MODE CONTROLLERS

(71) Applicant: Renesas Electronics Corporation, Tokyo (JP)

(72) Inventors: Bayan Liu Kihm, El Cerrito, CA (US); Vinod Aravindakshan Lalithambika, Harlow (GB); Allan Richard Warrington, Harlow (GB); Christopher John Miller, Harlow (GB)

(73) Assignee: Renesas Electronics Corporation, Tokyo (JP)

( * ) Notice: Subject to any disclaimer, the term of this patent is extended or adjusted under 35 U.S.C. 154(b) by 245 days.

(21) Appl. No.: 18/543,449

(22) Filed: Dec. 18, 2023

(65) Prior Publication Data

US 2025/0202354 A1 Jun. 19, 2025

(51) Int. Cl.
H02M 3/155 (2006.01)
(52) U.S. Cl.
CPC ................................... H02M 3/155 (2013.01)
(58) Field of Classification Search
CPC .... H02M 3/155; H02M 1/0009; H02M 3/156; H02M 3/158; H02M 3/1566; H02M 1/0025
See application file for complete search history.

(56) References Cited

U.S. PATENT DOCUMENTS

| | | | | |
|---|---|---|---|---|
| 9,154,031 B2 * | 10/2015 | Weng | .................... | H02M 3/156 |
| 2009/0001952 A1 * | 1/2009 | Chang | ................... | H02M 3/156 323/280 |
| 2014/0139198 A1 * | 5/2014 | Manlove | ................ | H02M 1/32 323/282 |

OTHER PUBLICATIONS

RAA215310 (datasheet)—"High performance 7-channel PMIC", Oct. 2023, Renesas Electronics, 2 pages. https://www.renesas.com/us/en/document/sds/raa215310-short-form-datasheet.

* cited by examiner

*Primary Examiner* — Thienvu V Tran
*Assistant Examiner* — Lauren Ashley Shaw
(74) *Attorney, Agent, or Firm* — SCULLY, SCOTT, MURPHY & PRESSER, P.C.

(57) ABSTRACT

A method of increasing a transient response of a current mode controller and a current mode controller with an improved transient response are provided. The current mode controller is configured to control a high side switch and a low side switch. The current mode controller includes a pulse width modulation generator.

12 Claims, 10 Drawing Sheets

NON-LINEAR TRANSIENT IMPROVEMENTS IN CURRENT MODE CONTROLLERS

TECHNICAL FIELD

The present disclosure relates to non-linear transient improvements in current mode controllers and in particular to a method of increasing the transient response of a current mode controller.

BACKGROUND

Current mode controllers are a type of DC-DC converters that regulate the output voltage to a desired value by measuring the current that passes through the inductor. The current mode controller can be used in buck converter circuits, for example. An important aspect of current mode controllers and their ability to regulate the output voltage is its transient response. When the load applied to a current mode controller changes, this will result in a change in the output voltage. This change will be either an increase or a decrease in the output voltage compared to the desired value. The transient response is a measure of how quickly the current mode controller can adjust the output voltage back to the desired value. A current mode controller with good transient response is one that has a fast transient response. This is desirable in order to avoid jittering and failure in the circuit.

In the art, the transient response depends on the bandwidth of the compensation loop. The compensation loop is the set of components, including capacitors and resistors, in the current mode controller that control the duty cycle of the pulse width modulator. The higher the bandwidth of the compensation loop, the better the transient response. The bandwidth can be increased by increasing the value of capacitance and resistance in the compensation loop. However, increasing the bandwidth results in less stability of the current mode controller resulting in, for example, increased noise and interference in the output. This can be offset by increasing the value of the output capacitance for the circuit; however, this will result in a more expensive system.

Therefore, a method of improving the transient response of a current mode controller whilst keeping the performance stable is required.

It is an object of the disclosure to address one or more of the above-mentioned limitations.

SUMMARY

According to a first aspect of the disclosure, there is provided a method of increasing a transient response of a current mode controller wherein the current mode controller is configured to control a high side switch and a low side switch.

Optionally, the current mode controller comprises a pulse width modulation generator with a duty cycle configured to set an on-time for the high side switch.

Optionally, the on-time for the high side switch is determined by at least one or more of: a sensing voltage, a compensation voltage and an output voltage.

Optionally, the high side switch and the low side switch are metal oxide field effect transistor switches.

Optionally, the method comprising: comparing the output voltage to a threshold voltage value and generating a first signal which can have a high value or a low value, wherein the first signal has a high value if the output voltage is less than the threshold voltage.

Optionally, the threshold voltage value is proportional to a target output voltage value.

Optionally, the method comprising: generating a second signal which can have a high value or a low value.

Optionally, the value of the second signal depends on a square wave function which can have a high value or a low value, the first signal and the second signal, whereby the value of the second signal is high if: the square wave function, the first signal and the second signal all have a high value; or the square wave function and the first signal have a high value and the second signal has a low value; or the square wave function having a high value and the first signal and the second signal have a low value.

Optionally, the current mode controller is configured to operate in a first state with a first sensing voltage if the second signal has a low value, wherein the first sensing voltage is proportional to an inductor current.

Optionally, the current mode controller is configured to operate in a second state with a second sensing voltage if the second signal has a high value, wherein the second sensing voltage is proportional to a difference between the inductor current and an offset current.

Optionally, the offset current is a DC current.

Optionally, the first operational state has a first duty cycle with a first on-time for the high side switch and the second operational state has a second duty cycle with a second on-time for the high side switch wherein the second on-time is longer than the first on-time.

Optionally, the first on-time has a duration set by the first sensing voltage and the second on-time has a duration set by the second sensing voltage.

Optionally, during the first or the second operational state the low side switch has an on-time which can be shortened a finite number of times when the square wave function is high.

According to a second aspect of the disclosure there is provided a current mode controller with an improved transient response using the method according to the first aspect, the current mode controller comprising a pulse width modulation generator.

Optionally, the pulse width modulation generator operates with a duty cycle configured to set an on-time for a high-side switch.

Optionally, the controller comprising: a feedback comparator configured to output a first signal; and a logic configured to receive a plurality of inputs and output a second signal, wherein at least one of the plurality of inputs is the first signal.

Optionally, the first signal can have a high value or a low value and the second signal can have a high value or a low value.

Optionally, at least one of the plurality of inputs for the second signal is the second signal.

DESCRIPTION OF THE DRAWINGS

The disclosure is described in further detail below by way of example and with reference to the accompanying drawings, in which.

DESCRIPTION

Figure 1:
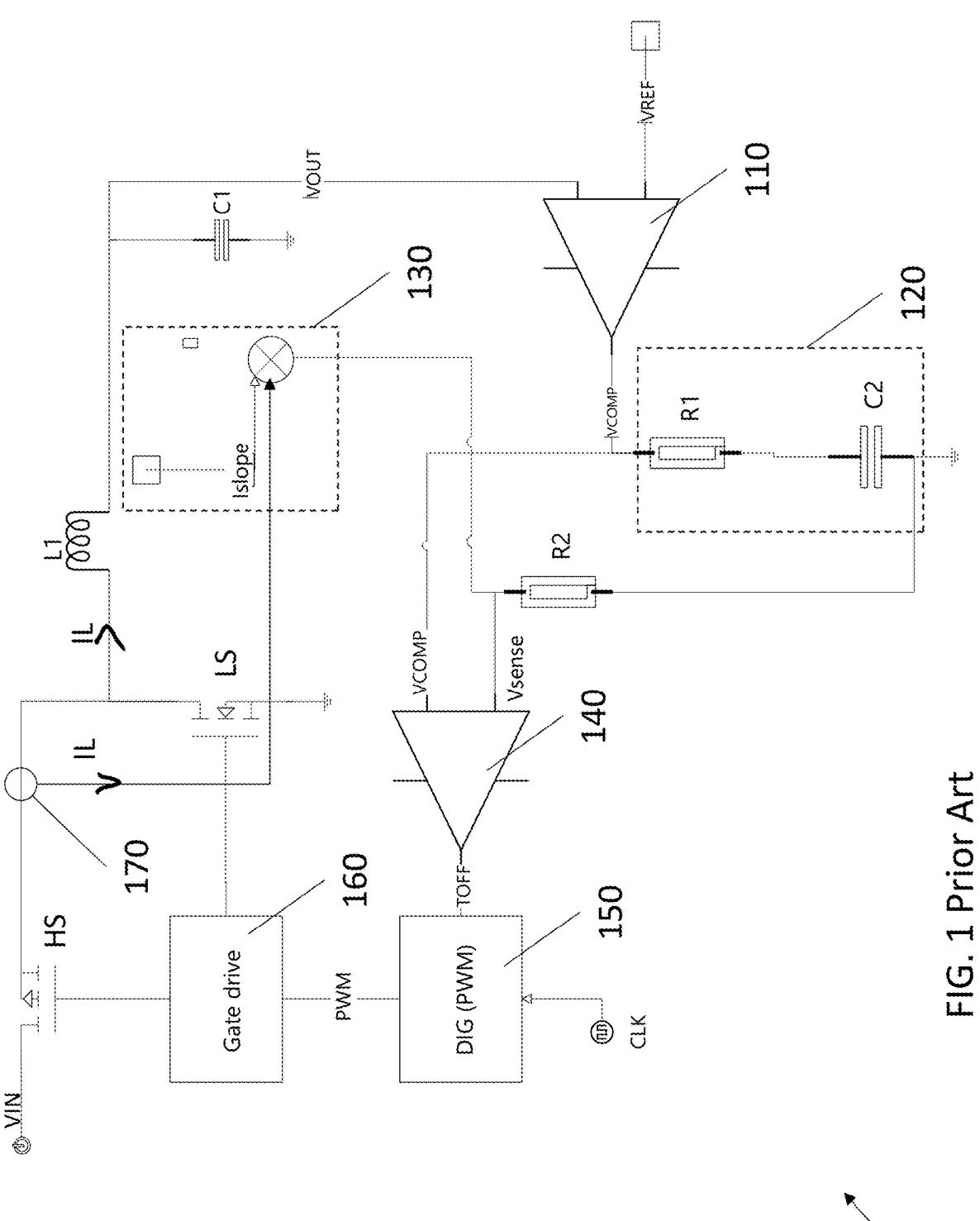
FIG. 1 is an example embodiment of a current mode controller according to the prior art.

FIG. 1 illustrates a current mode controller 100 according to the prior art. The current mode controller 100 comprises a transconductance amplifier 110 whose output is coupled to a compensation loop 120. The current mode controller 100 further comprises a slope compensator 130 coupled to a second comparator 140. There is a digital pulse width modulation (PWM) generator module 150 connected to a gate driver 160 which controls the high side power switch HS and the low side power switch LS. The HS and LS power switches are used to build up the current across the inductor L1 which provides the output of the current mode controller 100 via the output capacitor C1. The switches HS and LS could be, for example, metal-oxide field effect transistor (MOSFET) switches.

In operation, the output voltage VOUT is provided as a first input to the transconductance amplifier 110. The transconductance amplifier 110 compares VOUT to a reference voltage VREF to output a current proportional to the difference between VOUT and VREF. The current is converted to a voltage VCOMP by the compensation loop 120. If VOUT is less than VREF then VCOMP increases and vice-versa. The compensation loop 120 comprises a resistor R1 and a capacitor C2. VCOMP is then used as one of the two inputs for the second comparator 140. The second input for the second comparator 140 is a sensing voltage VSENSE. The sensing voltage VSENSE is obtained by through sensor 170 which is used to sense the inductor current IL. The sensed inductor current IL is passed into the slope compensator 130 and adjusted with a slope current Islope. The sensing voltage is then measured across resistor R2 and is given by the following equation: $VSENSE=(IL+Islope)*R2$. The compensation slope current (Islope) is generated internally and is proportional to the downward slope of inductor current.

The sensing voltage VSENSE and the compensation voltage VCOMP are compared by comparator 140 to output signal TOFF. If VSENSE is greater than VCOMP then TOFF is high and the digital PWM generator 150 instructs the gate drive 160 to switch off HS. The digital PWM generator also receives a second input from a switching clock CLK. This provides a predetermined duty cycle timer to the current mode controller 100. The duty cycle determines the on-time for HS which controls the build-up of current across the inductor L1. Depending on the application of the current mode controller, the frequency of the switching clock CLK will be different.

The current mode controller 100 is designed to control the peak value of the inductor current IL as measured across inductor L1 which in turn will determine the output voltage VOUT measured across C1. This is done through the turning on and off of HS and LS according to the sensing and output voltages. For example, for buck converters the current mode controller 100 will take the input voltage VIN and generate an output voltage VOUT that is less than VIN.

Figure 2:
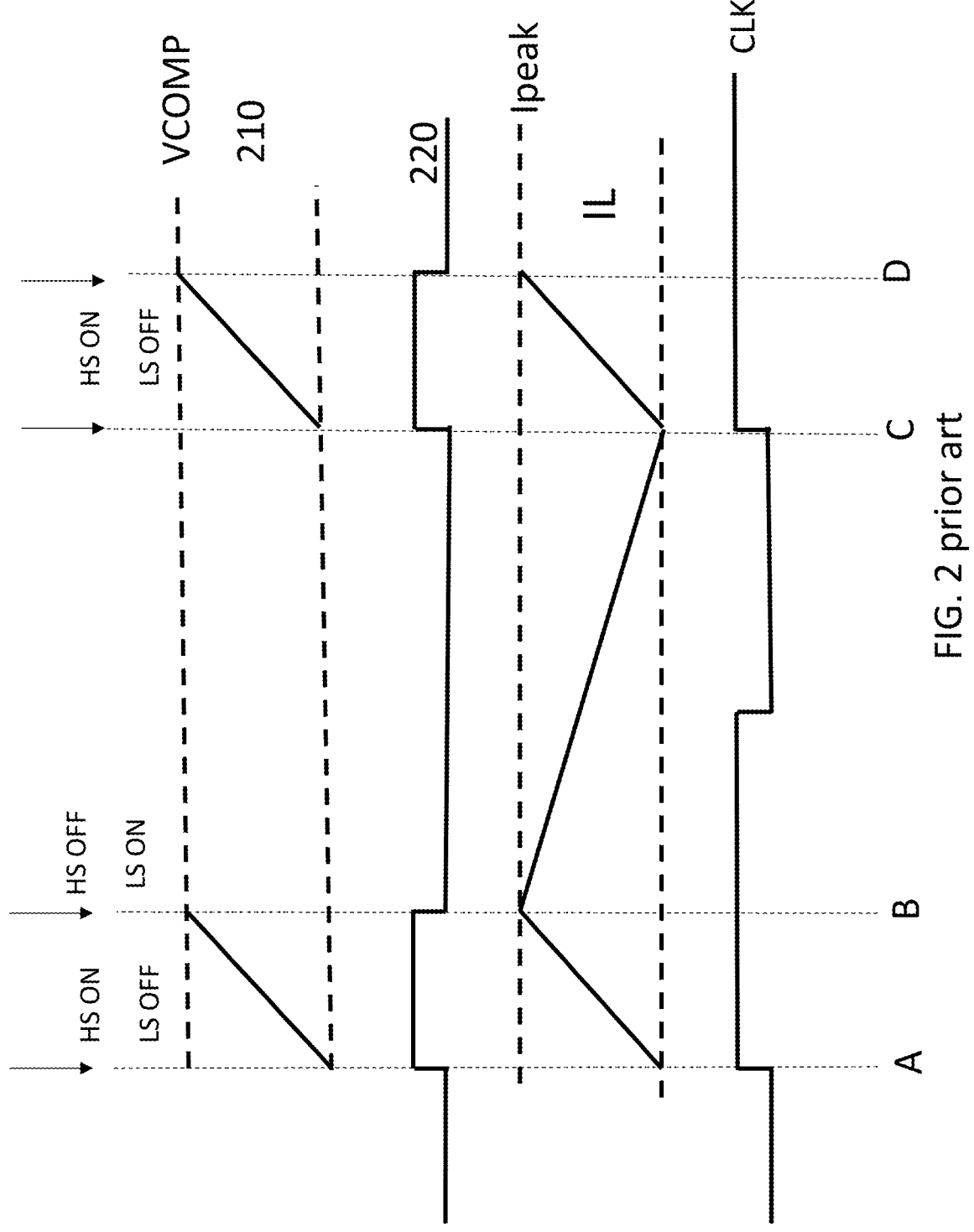
FIG. 2 is a graphical representation of the build-up of inductor current for the current mode controller in FIG. 1 according to the prior art.

FIG. 2 shows the build-up of the inductor current IL across inductor L1 for a current mode controller 100 according to the prior art.

At first the current mode controller 100 is switched on. The CLK signal is low and hence the PWM signal 220 is also low. Therefore the HS switch is not switched on. At point A, the CLK signal is high and the PWM signal 220 is also high as VSENSE 210 is less than VCOMP and therefore signal TOFF (not shown) is low. Hence at point A, HS is on and LS is off. Between point A and point B, HS remains on. The inductor current IL is increasing towards the peak value Ipeak. Concurrently, VSENSE 210 is also increasing. This is to be expected as the sensing voltage is dependent on the inductor current: $VSENSE=(IL\ Islope)*R2$.

At point B, VSENSE 210 is at the value of the compensation voltage VCOMP. Therefore the second comparator 140 of FIG. 1 outputs a high TOFF signal (not shown) resulting in a low PWM signal 220. HS is then turned off and LS turned on. The inductor current IL begins to decrease. The current mode controller 100 remains in this configuration until point C when the CLK is high once again. The behavior between points C and D is the same as between A and B. This cycle will repeat until the current mode controller 100 is switched off. How fast the current IL builds up depends upon the values of R1 and C2 in the compensation loop 120 of FIG. 1. These values are in turn limited by the desired stability of the system. Once the current mode controller is in operation, the transient response cannot be changed. Therefore, during such events as an output undershoot the current mode controller 100 cannot restore the output to the desired output any faster than the pre-set bandwidth during manufacturing.

Figure 3:
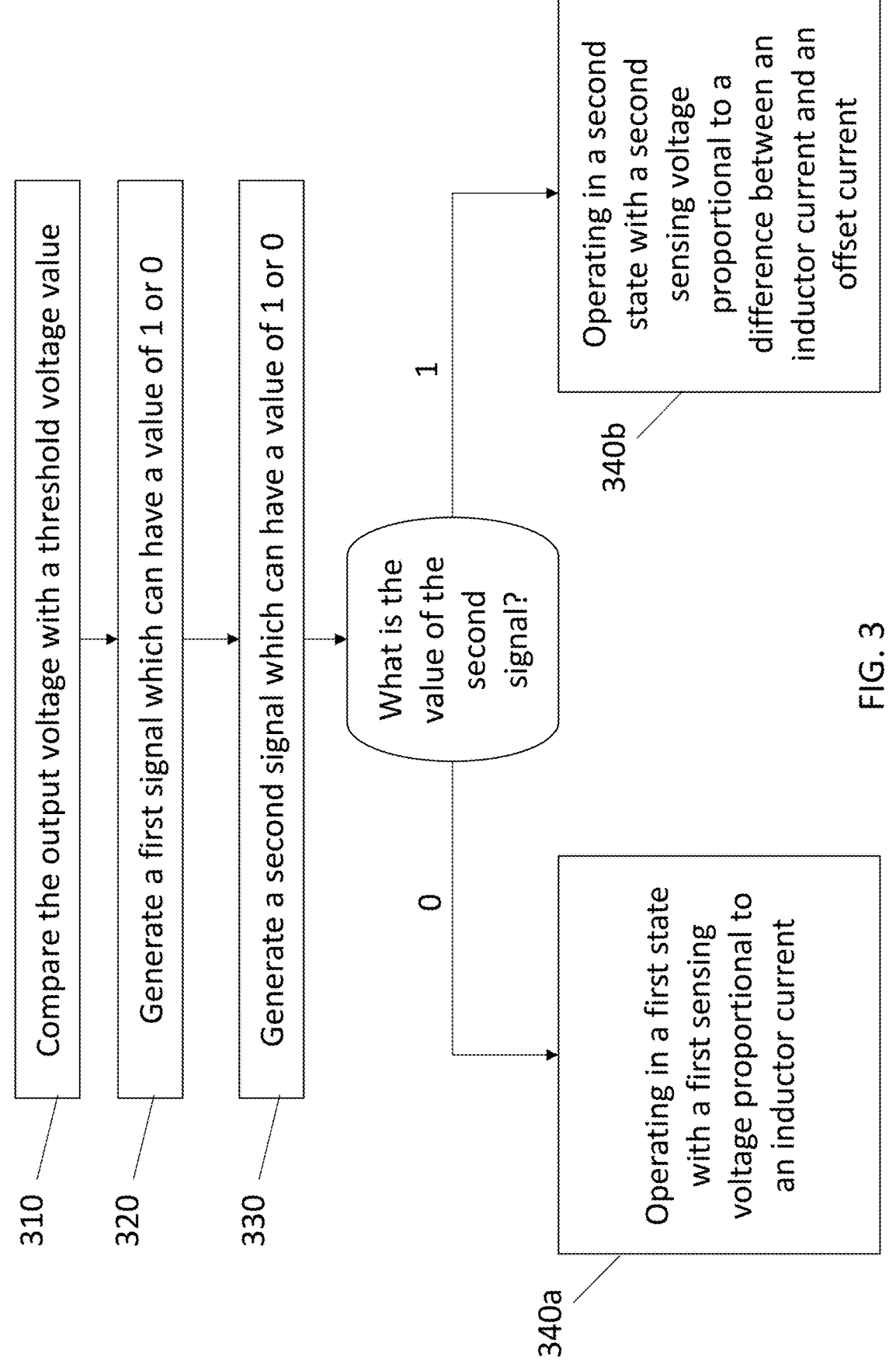
FIG. 3 is a method of improving the transient response of a current mode controller according to the present disclosure.

FIG. 3 is a flow chart illustrating a method of improving a transient response of a current mode controller wherein the current mode controller is configured to control a high side switch and a low side switch according to the present disclosure. The method allows for adaptive transient response in the event of output undershoots. The state of operation of the current mode controller changes if the output voltage falls below a threshold value. The threshold value is a proportional to a target voltage value or a fixed offset value from the target value wherein the target voltage value is the desired output voltage for a current mode controller configured to use the method of FIG. 3. The state of operation in this context refers to the duty cycle for the pulse width modulation (PWM) signal configured to set the on-time and off-time of the high side switch. The on-time for duty cycle in a given state of operation is determined by at least one or more of the following: a sensing voltage, a compensation voltage and an output voltage.

At step 310, the output voltage is compared with the threshold voltage value. It is important to note that the threshold voltage value is distinct and different from the reference voltage VREF. In the next step, step 320, a first signal is generated. The first signal can have a high value or a low value. A first signal with a high value is generated if the output voltage is less than the threshold voltage. When the first signal has a high value this can also be referred to as a pulse.

At step 330, a second signal is generated. The second signal can also have a high value or a low value. When the second signal has a high value this can also be referred to as a pulse. The second signal is generated through a logic which takes a plurality of inputs. The plurality of inputs comprises: a time window signal in the form of a square wave function, the first signal and the second signal. The time window signal can also have a high value or a low value. The duty cycle for the time window signal indicates the time period for which the second signal can remain high. The second signal can follow the first signal pulses within the on-time for the time window signal. The number of pulses of the first signal that the second signal can pass through is programmable. Depending on the value of the second signal, the current mode controller will operate in one of two states.

If the second signal has a low value, then the next step of the method is step 340a. In this step, the current mode controller is configured to operate in a first state. The first state is defined as an operational state with a first sensing voltage, wherein the first sensing voltage is proportional to an inductor current. This first state can also be referred to as the normal operational state as the current mode controller operates in the same way as the current mode controllers of the prior art.

If the second signal has a high value, then the next step of the method is step 340b. In this step, the current mode controller is configured to operate in a second state. The second state is defined as an operational state with second sensing voltage, wherein the second sensing voltage is proportional the difference between the inductor current and an offset current. The offset current is a DC current with a predetermined value. The pre-determined value can be programmable. This second operational state can also be referred to as the non-linear operational state. The second operational state for the current mode controller will be triggered when the output is undershooting and a faster transient response is required.

Figure 4:
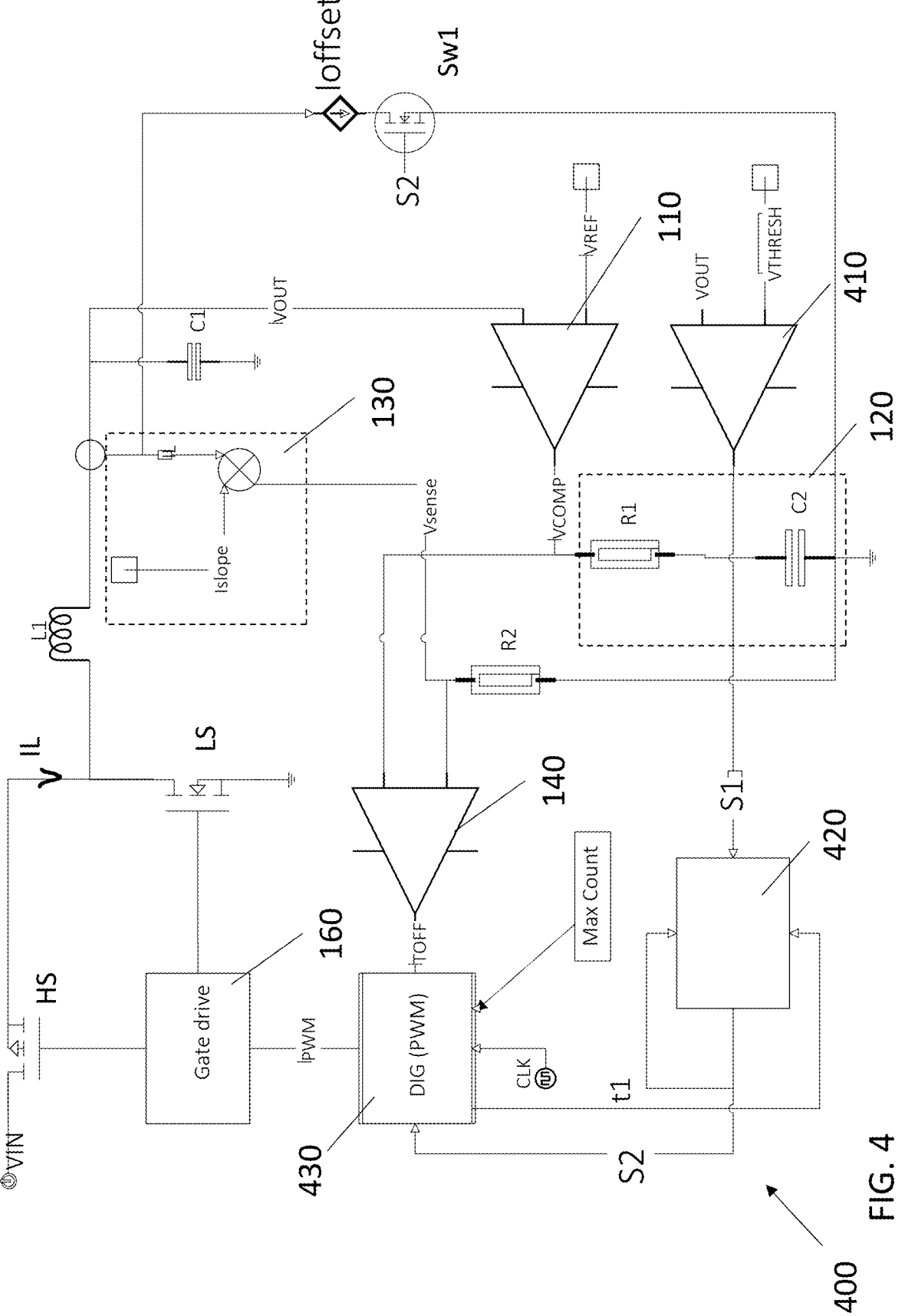
FIG. 4 is an example embodiment of a current mode controller for implementing the method of FIG. 3.

FIG. 4 is a current mode controller 400 configured to implement the method of FIG. 3. For consistency, any components are also present in the current mode controller 100 and serve the same function in current mode controller 400 have been given the same labelling. For brevity, their operational function will not be repeated here as it is the same as for current mode controller 100.

The current mode controller 400 comprises a feedback comparator 410, a logic 420 and a digital pulse width modulator (PWM) generator 430. The feedback comparator 410 is configured to output a first signal S1. The first signal can have a high value or a low value. The feedback comparator 410 compares the output voltage VOUT to a threshold voltage value VTHRESH. The first signal S1 is high if VOUT<VTHRESH. The threshold voltage value is programmable depending on the application for the current mode controller 400. The first signal S1 is one of a plurality of inputs for the logic 420 which is configured to generate a second signal S2. The second signal S2 can also have a high value or a low value. The other inputs into the logic include the signal S2, and a time window signal in the form of a square wave function t1. The time window signal t1 can have a high value or a low value, wherein when the t1 has a high value it represents a time window for which the signal S2 can have a high value. The time window signal t1 can also be programmable depending on the application for the current mode controller 400.

The digital PWM generator 430 provides time window signal t1 to the logic 420. The digital PWM generator 430 is configured to generate a PWM signal with a specific duty cycle to send to the gate driver 160 to control the high side switch HS and the low side switch LS. The digital PWM generator 430 in the current mode controller 400 also receives the output signal TOFF and the switching CLK and in addition receives the second signal S2 and a maximum count value MAX COUNT.

If the second signal S2 has a low value, then the current mode controller 400 operates in the first operational state. During this state, the current mode controller 400 operates as it does in the prior art. The sensing voltage VSENSE received by the comparator 140 is given by VSENSE=(IL+Islope)*R2. The on-time duration for the high side switch HS is dependent upon how long it takes for VSENSE to reach the compensation voltage VCOMP.

If the second signal S2 has a high value, then the current mode controller 400 operates in a second operational state. During the second operational state, the digital PWM generator 430 adjusts the duty cycle of the PWM signal configured to turn on and off HS and LS. In the second operational state, the duty cycle is adjusted such that the HS is on for an extended period of time. This is achieved by adjusting the sensing voltage VSENSE. During the second operational state, the high value of the second signal S2 triggers switch Sw1 to turn on. This allows for an offset current Ioffset to flow through resistor R2. The offset current Ioffset is a programmable value which, for example can be chosen as a fraction of ripple current in the inductor. In this operational state the sensing voltage is then given by: VSENSE=(IL+Islope−Ioffset)*R2. The offset current is a direct current (DC) and is preprogrammed depending on the application the current mode controller 400 is used for. The offset current Ioffset increases the length of time it takes for VSENSE>VCOMP and therefore extends the on-time for the HS. This allows for the current mode controller 400 to ramp up the inductor current IL across inductor L1 in a shorter amount of time, in other words it increases the transient response of the current mode controller. Further, the second operational state has the additional benefit of increasing the peak inductor current. During this second operational state, the on-time for the low side switch LS can also be shortened to move onto the next switching cycle faster. Normally, a constant frequency current mode controller turns the switch on at the chosen frequency. To shorten the on-time for the low side switch LS, the duty cycle is temporarily increased by shortening the off-time to a minimum off time which is a programmable value. The low side switch on-time can only be shortened a finite number of times when the square wave function t1 is high. The digital PWM generator 430 comprises a counter, which increases incrementally by a value of one each time the low side on-time is shortened is a given time window t1. The maximum count value MAX COUNT sets the number of times the low side switch on-time can be shortened and the high side switch can be restarted during time window signal t1. For example, if MAX COUNT has a value of 1 then the low side switch on-time can only be shortened once in time window t1. Once the time window t1 has ended, the counter in digital PWM generator 430 resets to 0. The maximum count value MAX COUNT has a preset value and provides another way for the bandwidth of the controller 400 to be controlled.

The feedback comparator 410 generates a first signal S1 with a high value when the output voltage VOUT falls below the threshold voltage VTHRESH. The logic 420 processes the first signal S1 to generate the second signal S2. The digital PWM generator 430 then modifies the PWM signal when the second signal S2 has a high value. If S2 goes high during a high side switch on-time, then the high side switch on-time is immediately extended to reduce the transient. This marks the first extended high side on-time. If S2 is still high after this first extended high side on-time is over and the low side switch is turned on then the low side on-time will be shortened as described above and the high side switch will be turned on again. If instead, S2 goes high during a time where the high side switch is off and the low side switch is on the low side switch will be immediately turned off and the high side switch turned on with an extended on-time.

Figure 5:
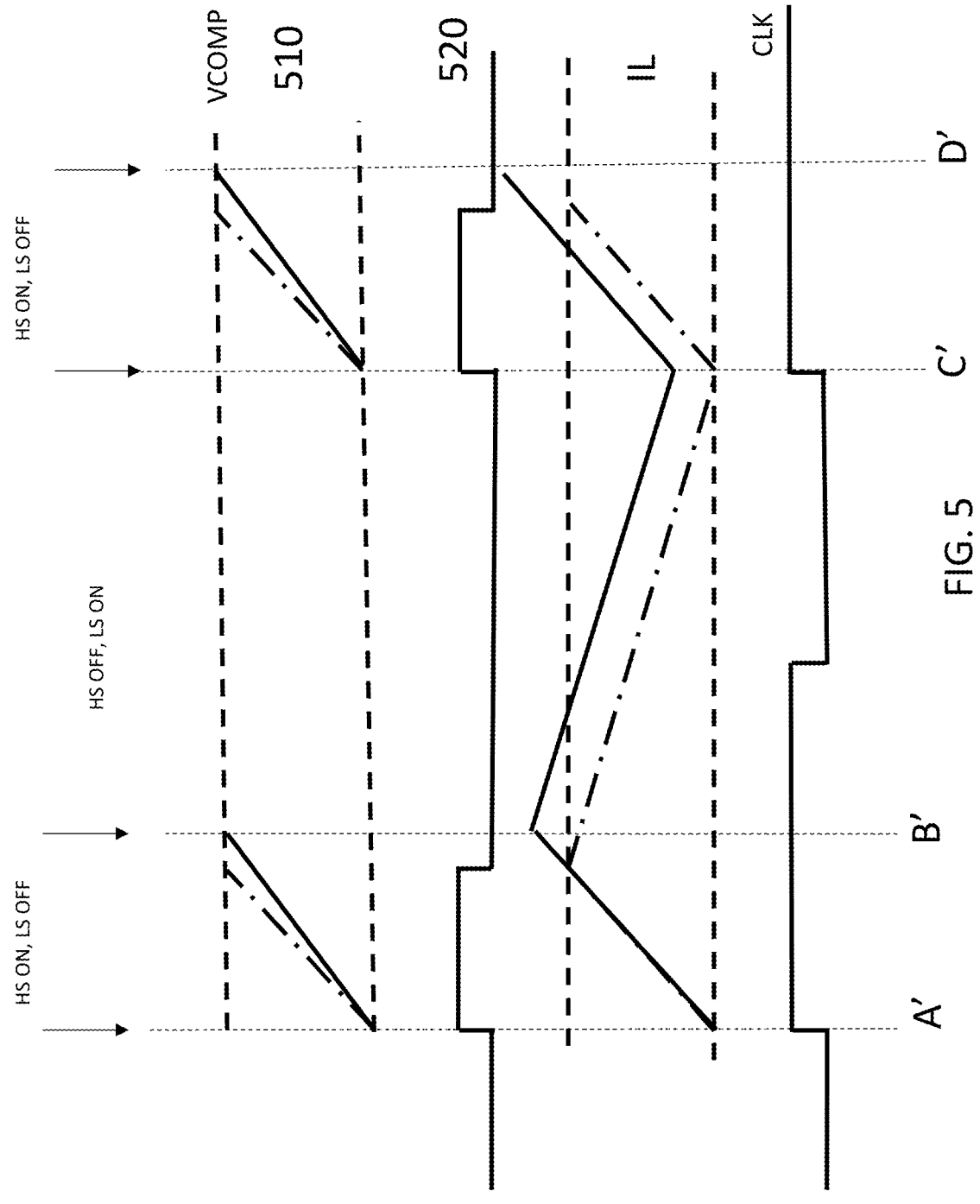
FIG. 5 is a graphical representation of the build-up of inductor current for the current mode controller of FIG. 4 during the first operational state and the second operational state.

FIG. 5 shows a graphical representation of the build-up of inductor current in the current mode controller 400 during the first and second operational states. The sensing voltage 510 and the inductor current IL are shown in dashed lines for the first operational state and solid for the second operational state.

During the second operational state the sensing voltage takes longer to increase above the compensation voltage. This can be seen by the shallower gradient of the solid line compared to the dashed line for VSENSE 510. This increases the HS on-time and thus increases the peak inductor current as can be seen by comparing the solid and dashed IL lines.

Figure 6A:
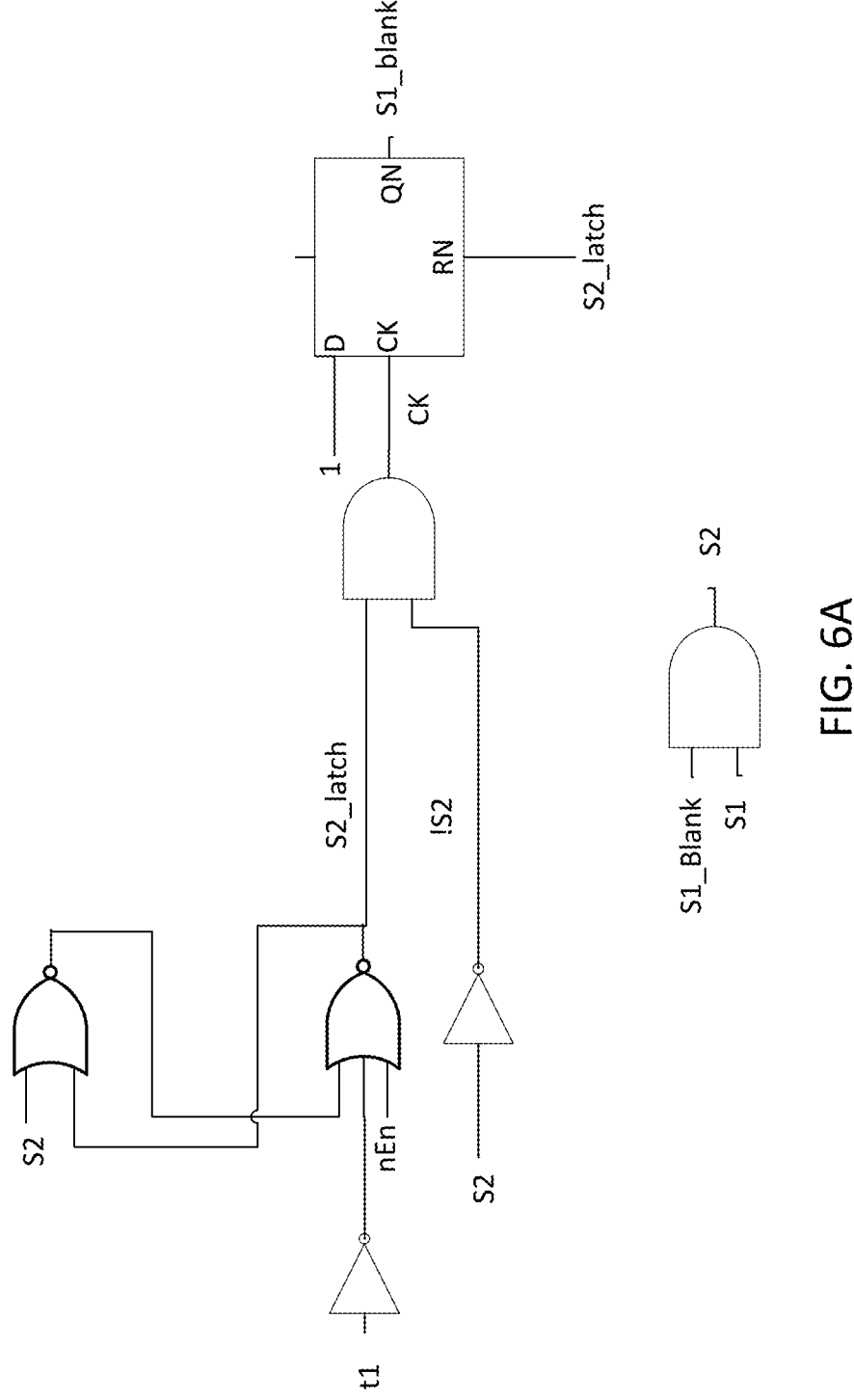
FIG. 6A is an example embodiment of the logic chip of the current mode controller of FIG. 4.

FIG. 6A shows an example embodiment for the logic 420 in current mode controller 400. The logic 420 is configured to generate the second signal S2 based on a plurality of inputs comprising the first signal S1, the square wave function t1 (time window) and the second signal S2. The logic 420 allows only one high value first signal S1 to pass through to S2 within the given time window t1. In other embodiments, a D type flip flop that allows more than one S1 pulse to pass through to S2 within a time window t1 can be used in logic 420.

Figure 6B:
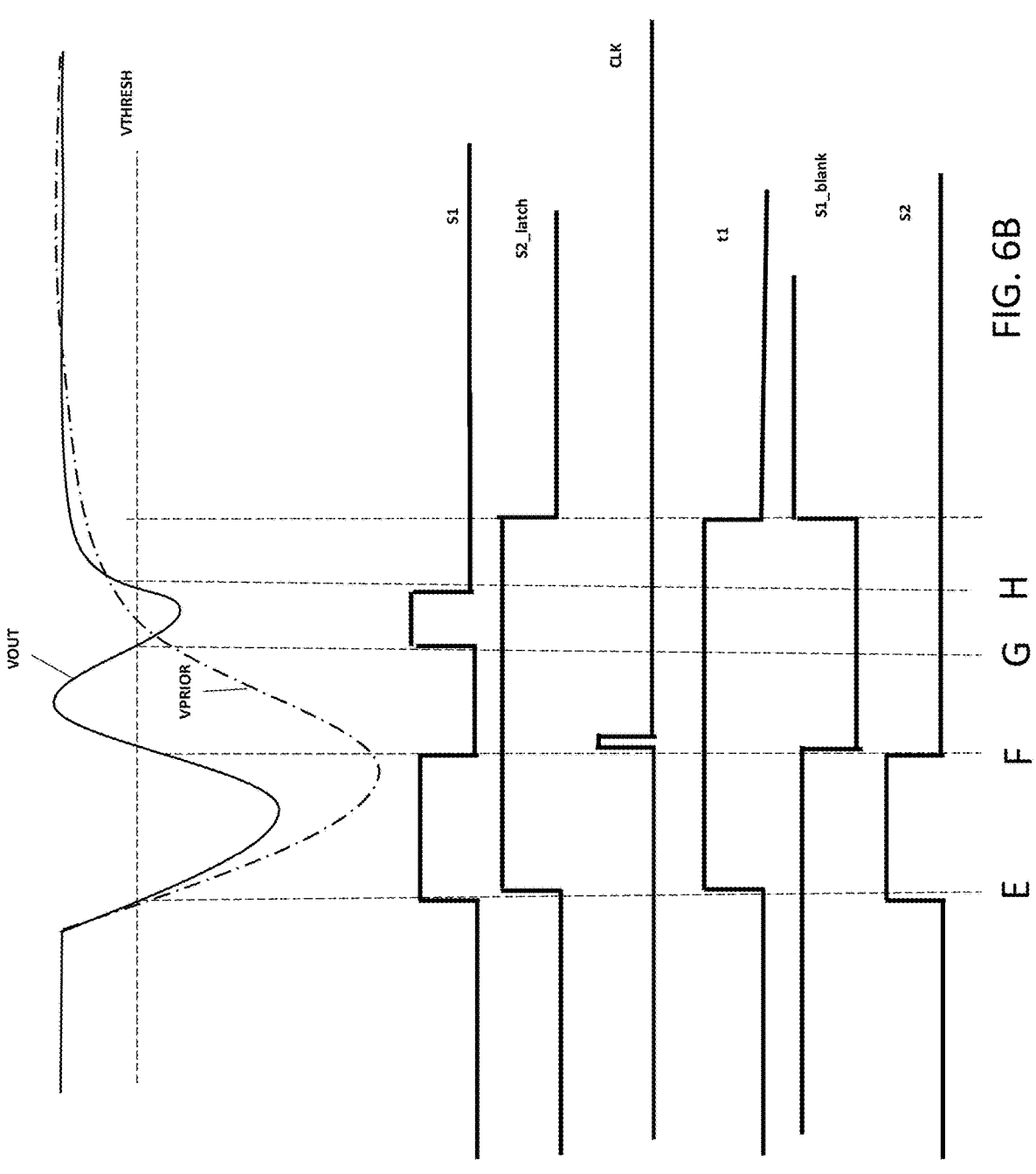
FIG. 6B is a graphical representation of the operation of the logic chip of FIG. 6A.

FIG. 6B shows an example of the change to the output voltage VOUT due to the improved transient response of the second operational state for the current mode controller 400. The solid line shows the output voltage VOUT for the second operational state whilst the dot-dashed line shows the output voltage VPRIOR for the prior art current mode controller 100.

At point E, the output voltage VOUT decreases below the threshold voltage value VTHRESH. At this point, the feedback comparator 410 changes the first signal S1 value from low to high. This also results in the second signal S2 having a high value and the square wave function t1 having a high value. Therefore, the current mode controller 400 is now operating in the second operational state. This is reflected in the behavior of VOUT which increases rapidly. At point F, VOUT is now once again greater than VTHRESH. The first signal S1 now has a low value. However, the value of t1 is still high. Therefore, the current mode controller 400 continues to operate in the second operational state. At point G, VOUT dips below VTHRESH again and another high value S1 pulse is generated, S2 still remains low as it is only programmed to trigger one during t1. However, as t1 is still high this does not affect the operational state of the current mode controller. After point H, the output voltage levels out to the target value and S1, t1 and S2 all have a low value, hence the current mode controller 400 returns to operating in the first operational state.

The purpose of the time window of the square wave function t1 is to act as a blank out period to reduce the bandwidth of the system. This increases the stability of the current mode controller whilst also improving the transient response.

Figure 7A:
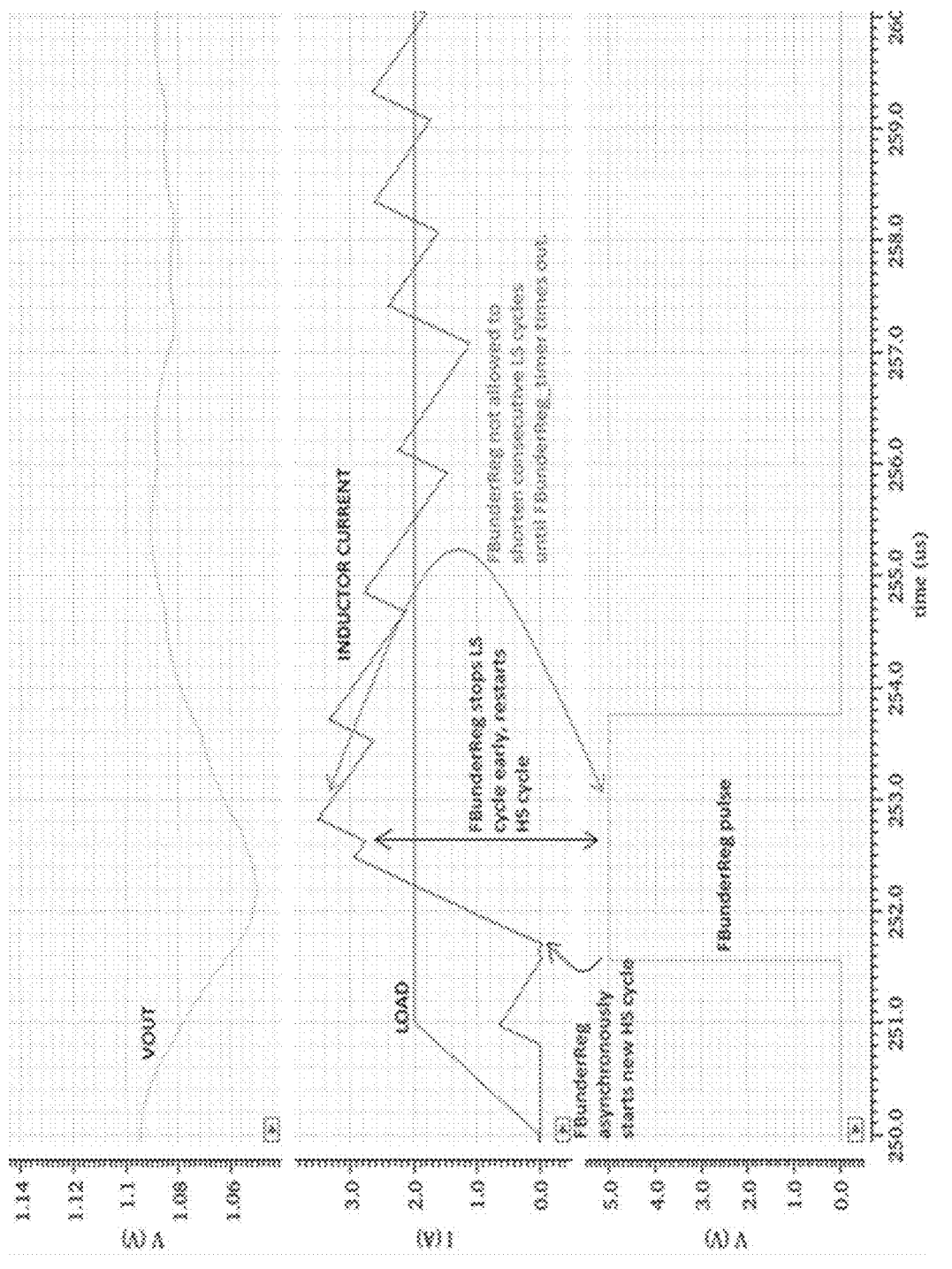
FIG. 7A is a simulation result showing the operation of the embodiment of the current mode controller using the method of FIG. 3 during discontinuous conduction mode.

FIG. 7A shows a simulation example of a current mode controller with improved transient response using the method of FIG. 3. In this example, the second operational state is triggered when the current mode controller is in discontinuous conduction mode. Between 251 and 252 microseconds, the S2 pulse is triggered as the load applied to the current mode controller increases. This results in the high side switch being turned on and having an extended on-time as is indicated by increase in the inductor current. This allows for the inductor current to reach its peak value without having to wait for the sensing voltage to build up to the compensation voltage. Typically, it is practice to wait until the CLK signal goes high before turning off the low side switch. A shortened low side switch on-time means the minimum programmable time period. If this is expired then the low side switch is turned off. When the low side switch is on, the inductor current decreases. By minimizing the time the low side switch is on, the reduction in the inductor current is also minimized. In this simulation example, the MAX COUNT value is set to 1, meaning that the low side switch cycle can only be shortened once in a given time window signal.

Figure 7B:
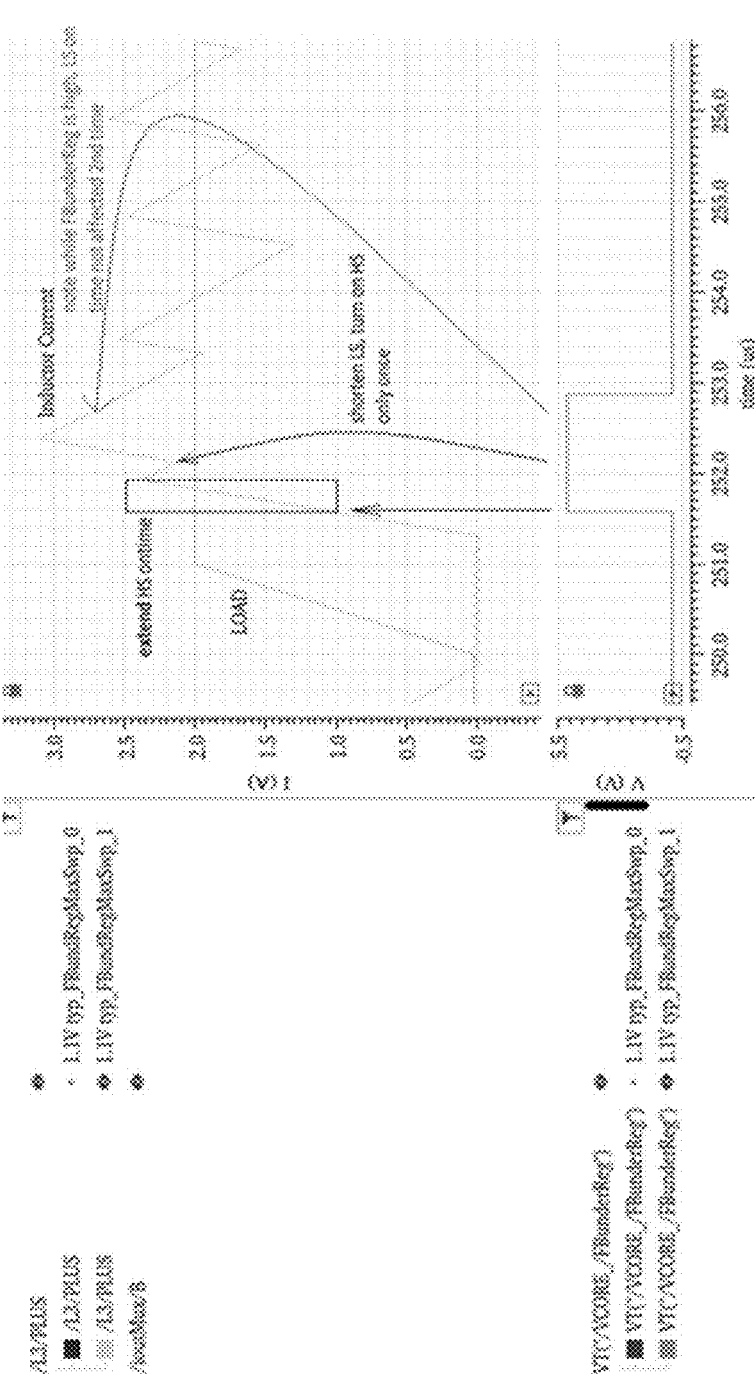
FIG. 7B is a simulation result showing the operation of the embodiment of the current mode controller using the method of FIG. 3 during continuous conduction mode.

FIG. 7B shows a simulation example of a current mode controller with improved transient response using the method of FIG. 3. In this example, the second operational state is triggered when the current mode controller is already in continuous conduction mode. In this case the S2 pulse is triggered whilst the HS switch is already on, extending the cycle by reducing the current sense gain. The following low side switch cycle is ended abruptly allowing for the high side switch cycle to be restarted.

Figure 7C:
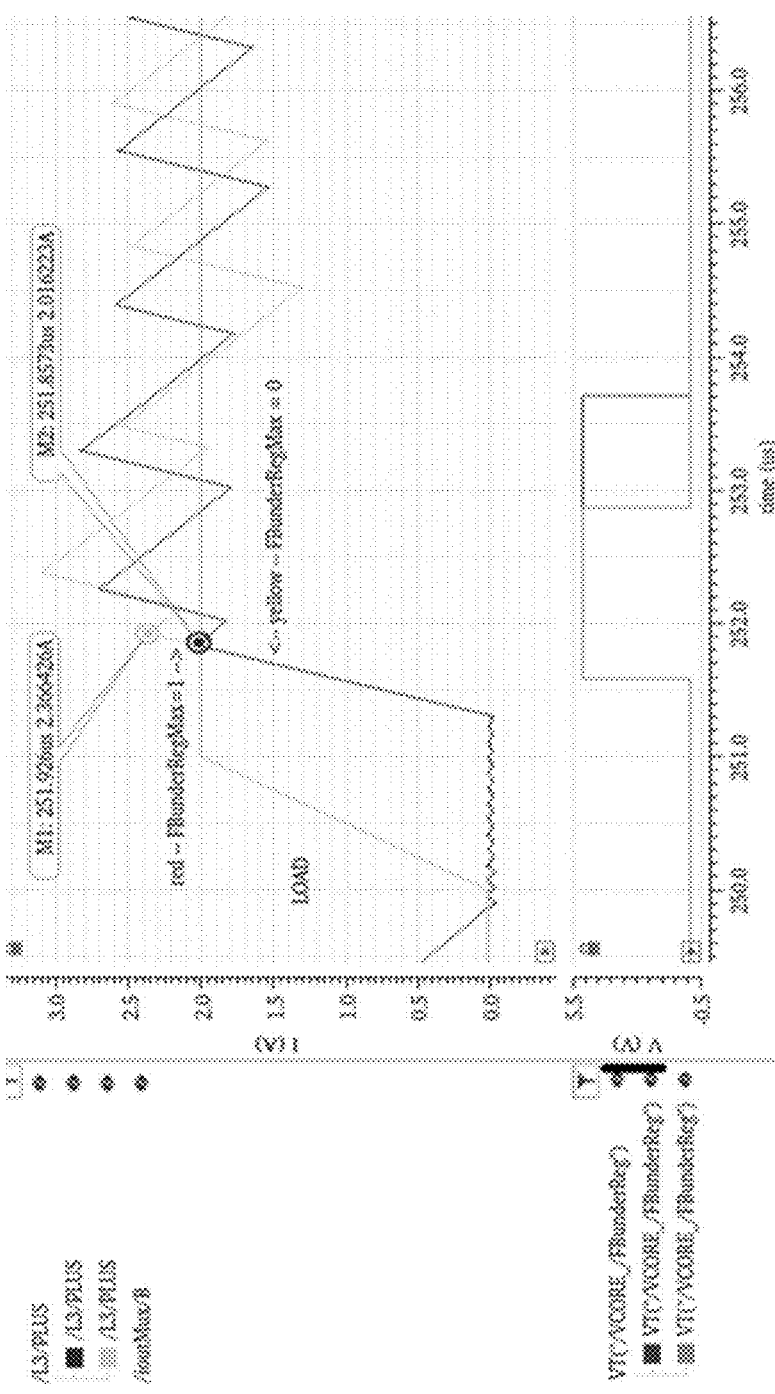
FIG. 7C is a simulation result showing the affect of different offset currents on the operation of the current mode controller according to the present disclosure.

FIG. 7C is a simulation example of a current mode controller with improved transient response using the method of FIG. 3. This figure displays the effect of choice of offset current on the build-up of the inductor current as well as the peak value of inductor current. The larger the offset current, the larger the peak inductor current. The offset current can be preset depending upon the rated load for different regulators that the current mode controller is being used for.

A skilled person will therefore appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A method of increasing a transient response of a current mode controller, the method comprising:

controlling, by the current mode controller, a high side switch and a low side switch;

comparing, by the current mode controller, an output voltage to a threshold voltage, wherein the threshold voltage is proportional to a target value of an output voltage;

generating, by the current mode controller, a first signal having one of a high value and a low value, wherein the first signal has a high value if the output voltage is less than the threshold voltage; and generating a second signal having one of the high value and the low value, wherein:

the second signal depends on the first signal, the second signal, and a square wave function that varies among the high value and the low value; and the second signal has the high value under a condition among:

the square wave function, the first signal and the second signal have the high value;

the square wave function and the first signal have the high value and the second signal has the low value; and the square wave function has the high value, and the first signal and the second signal have the low value.

2. The method of claim 1, wherein the current mode controller comprises a pulse width modulation generator with a duty cycle configured to set an on-time for the high side switch.

3. The method of claim 2, wherein the on-time for the high side switch is determined by at least one or more of:

a sensing voltage, a compensation voltage and an output voltage.

4. The method of claim 1, wherein the high side switch and the low side switch are metal oxide field effect transistor switches.

5. The method of claim 1, wherein the current mode controller is configured to operate in a first state with a first sensing voltage if the second signal has the low value, wherein the first sensing voltage is proportional to an inductor current.

6. The method of claim 5, wherein the current mode controller is configured to operate in a second state with a second sensing voltage if the second signal has the high value, wherein the second sensing voltage is proportional to a difference between the inductor current and an offset current.

7. The method of claim 6, wherein the offset current is a DC current.

8. The method of claim 6, wherein the first state has a first duty cycle with a first on-time for the high side switch and the second state has a second duty cycle with a second on-time for the high side switch wherein the second on-time is longer than the first on-time.

9. The method of claim 8, wherein the first on-time has a duration set by the first sensing voltage and the second on-time has a duration set by the second sensing voltage.

10. The method of claim 9, wherein the low side switch has an on-time which can be shortened a finite number of times when the square wave function is high.

11. The method of claim 1, wherein the current mode controller comprises:

a feedback comparator configured to output the first signal; and a logic circuit configured to receive a plurality of inputs and output the second signal, wherein at least one of the plurality of inputs is the first signal.

12. The method of claim 11, wherein at least one of the plurality of inputs is a feedback of the second signal.

\* \* \* \* \*